(12) United States Patent
Kubo

(10) Patent No.: US 9,848,290 B2
(45) Date of Patent: Dec. 19, 2017

(54) LOCATION BASED COMPUTERIZED SYSTEM AND METHOD THEREOF

(75) Inventor: Kiyo Kubo, Oakland, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 908 days.

(21) Appl. No.: 13/417,338

(22) Filed: Mar. 12, 2012

(65) Prior Publication Data

US 2012/0231816 A1 Sep. 13, 2012

Related U.S. Application Data

(60) Provisional application No. 61/464,769, filed on Mar. 10, 2011.

(51) Int. Cl.
*G06F 17/30* (2006.01)
*H04W 4/02* (2009.01)
*H04M 1/725* (2006.01)
*H04W 4/00* (2009.01)

(52) U.S. Cl.
CPC .......... *H04W 4/02* (2013.01); *G06F 17/3087* (2013.01); *H04M 1/72572* (2013.01); *H04W 4/001* (2013.01)

(58) Field of Classification Search
CPC ..... H04W 4/02; H04W 4/001; G06F 17/3087; H04M 1/72572
See application file for complete search history.

(56) References Cited

U.S. PATENT DOCUMENTS

| | | | | |
|---|---|---|---|---|
| 8,233,915 | B2* | 7/2012 | Paulson | G01S 19/25 370/311 |
| 8,680,985 | B2* | 3/2014 | Brady, Jr. | G01C 21/20 340/539.11 |
| 8,893,010 | B1* | 11/2014 | Brin | H04L 29/06476 715/738 |
| 8,984,026 | B2* | 3/2015 | Kim | G06F 17/30595 707/736 |
| 2006/0270421 | A1* | 11/2006 | Phillips | G08B 21/0236 455/457 |
| 2007/0032225 | A1* | 2/2007 | Konicek | H04M 1/72513 455/417 |
| 2007/0060171 | A1* | 3/2007 | Sudit et al. | 455/456.1 |

(Continued)

OTHER PUBLICATIONS

Duri et al., An approach to providing a seamless end-user experience for location-aware applications, Proceeding WMC '01 Proceedings of the 1st international workshop on Mobile commerce, pp. 20-25, ACM, 2001, retrieved on Apr. 15, 2016, retrieved from the Internet at <URL: http://dl.acm.org/citation.cfm?id=381465>.*

*Primary Examiner* — Tyler Torgrimson
(74) *Attorney, Agent, or Firm* — Hewlett Packard Enterprise Patent Department

(57) ABSTRACT

The invention includes a computerized method for providing a location based service, the method comprising reporting a location of at least one user client device to a location based service program, querying a database of location based applications of the location based service program to identify one or more location based applications associated with the location of the at least one user client device, and launching at least one of the one or more location based applications on the user client device so as to offer a user experience for the location of the user client device.

20 Claims, 3 Drawing Sheets

(56) References Cited

U.S. PATENT DOCUMENTS

| | | | | |
|---|---|---|---|---|
| 2007/0061332 | A1* | 3/2007 | Ramer et al. | 707/10 |
| 2007/0133385 | A1* | 6/2007 | Hoek | G06F 17/3087 |
| | | | | 370/201 |
| 2007/0149212 | A1* | 6/2007 | Gupta et al. | 455/456.1 |
| 2008/0233927 | A1* | 9/2008 | Moon et al. | 455/414.1 |
| 2009/0073033 | A1* | 3/2009 | Price | G06Q 30/02 |
| | | | | 342/357.34 |
| 2009/0204898 | A1* | 8/2009 | Jones | G06F 17/30029 |
| | | | | 715/719 |
| 2010/0004003 | A1* | 1/2010 | Duggal et al. | 455/456.3 |
| 2010/0056173 | A1* | 3/2010 | Bloom | H04W 4/02 |
| | | | | 455/456.1 |
| 2010/0306233 | A1* | 12/2010 | Zheng | G06F 17/30044 |
| | | | | 707/769 |
| 2011/0078139 | A1* | 3/2011 | Xiao | G06F 17/30241 |
| | | | | 707/724 |
| 2011/0105150 | A1* | 5/2011 | Moon et al. | 455/456.3 |
| 2011/0250875 | A1* | 10/2011 | Huang et al. | 455/418 |
| 2011/0291927 | A1* | 12/2011 | Slaby | B60R 11/0241 |
| | | | | 345/158 |
| 2011/0307478 | A1* | 12/2011 | Pinckney | G06N 99/005 |
| | | | | 707/724 |
| 2011/0312333 | A1* | 12/2011 | I'Anson | H04W 8/245 |
| | | | | 455/456.1 |
| 2011/0314502 | A1* | 12/2011 | Levy | H04N 7/106 |
| | | | | 725/46 |
| 2012/0042036 | A1* | 2/2012 | Lau | G06F 8/61 |
| | | | | 709/217 |
| 2012/0127169 | A1* | 5/2012 | Barcay | G06T 15/20 |
| | | | | 345/419 |
| 2014/0149573 | A1* | 5/2014 | Tofighbakhsh | H04L 41/5067 |
| | | | | 709/224 |

* cited by examiner

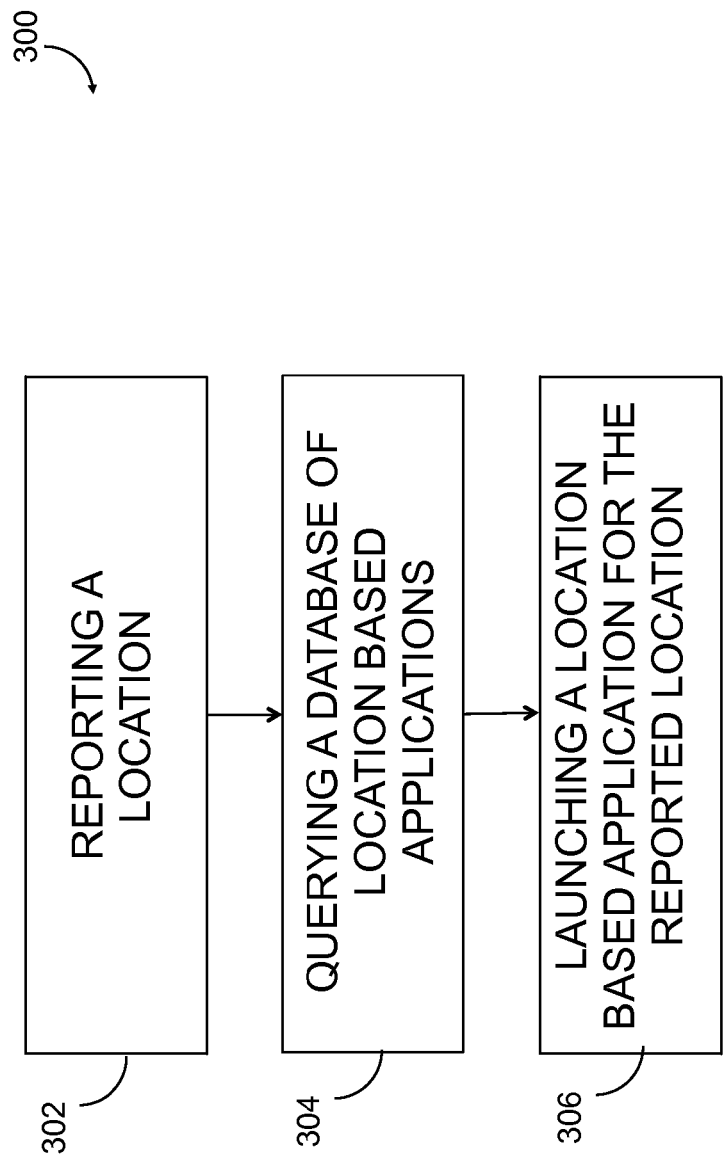

LOCATION BASED COMPUTERIZED SYSTEM AND METHOD THEREOF

CROSS-REFERENCE TO RELATED APPLICATION

This application claims the benefit of U.S. Provisional Application Ser. No. 61/464,769, entitled "System for Providing users with information about locations" filed on Mar. 10, 2011, the entire contents and substance of which are hereby incorporated in total by reference.

TECHNICAL FIELD

The present document relates to location based services for mobile devices.

BACKGROUND

Location based services use the position of an end-user to improve the relevance, context, and value of an application. Examples of location based services include maps and navigation services, tracking services, information services, social networking, and advertising applications.

Users seeking to use location based services to improve his or her experience at a location may install separate applications for different locations. To do so, users search to find the applications and then download applications for the locations of interest. In doing this, the user spends significant time searching for applications. Further, the user may not know of the existence of an application at any given location or may not even consider that a location based service may be valuable.

SUMMARY

The inventors have conceived of a computerized system and method that combines a plurality of location based applications into a single location based service program. Specifically, the system of the present invention may be downloaded in a single installation to provide location based services for a plurality of locations associated with the location based service program. The invention may be more fully understood by reference to the following drawings.

BRIEF DESCRIPTION OF THE DRAWINGS

FIG. 3 is a flowchart for a method, according to some embodiments of the invention.

DETAILED DESCRIPTION

During the course of this description like numbers will be used to identify like elements according to the different views which illustrate the invention.

Figure 1:
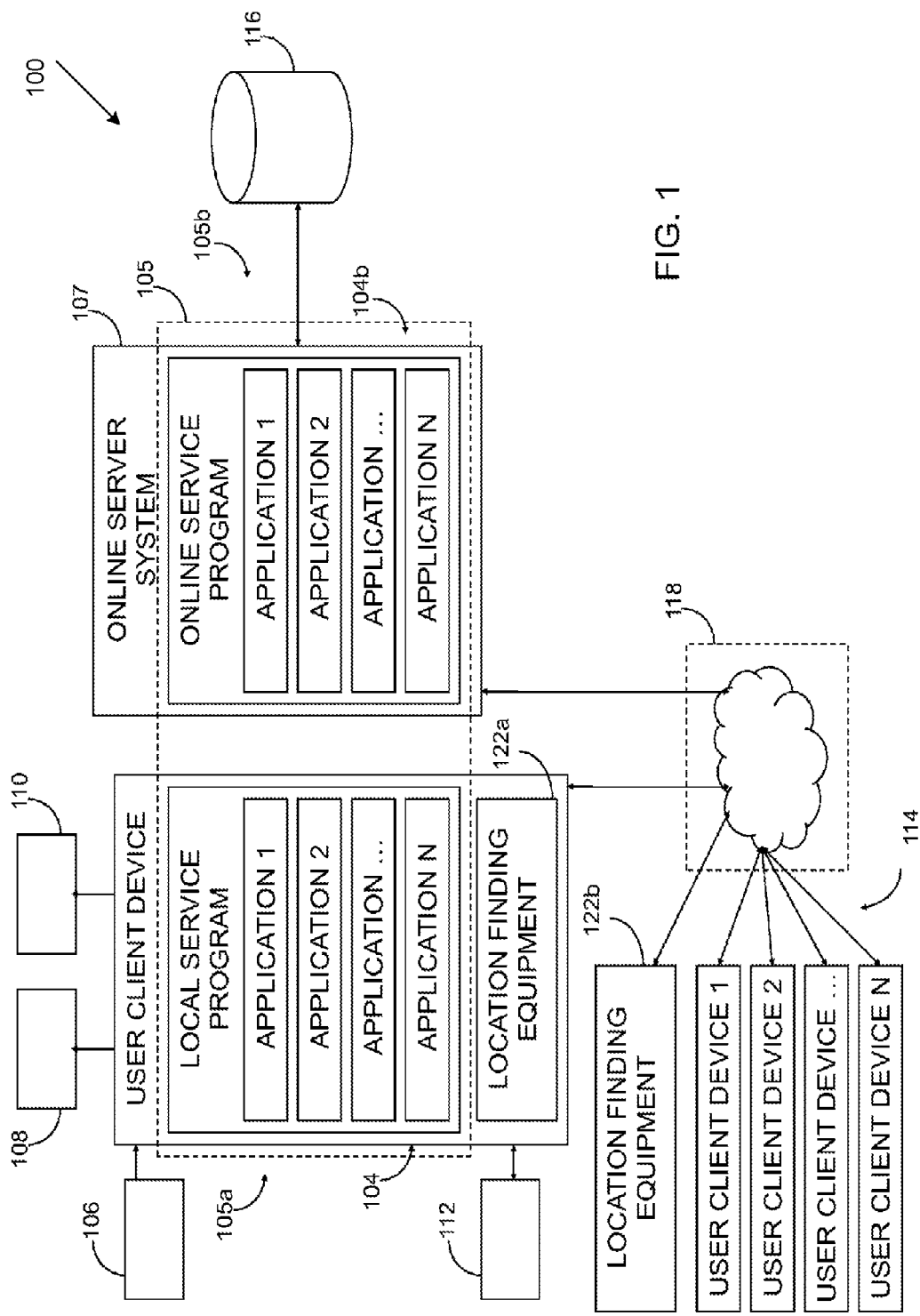
FIG. 1 is a schematic illustration of a computerized system, according to some embodiments.

FIG. 1 illustrates an embodiment of a computerized system 100. The computerized system 100 includes a user client device 102 configured to execute one or more of a plurality of location based applications 104, each of which is configured to provide a location based service for a user via a location based service program 105. The location based service program 105 is configured to receive and process data from the location based applications 104.

As used herein "program" refers to software or firmware components that may be executed by, or utilized by one or more user client devices of the computerized system and is meant to encompass individual or groups of executable files, data files, libraries, drivers, scripts, database records, etc. It will be appreciated that the location based service program may include a local component and/or an online component. The local component may be a local location based service program 105a executed on the user client device 102, and the online component may be an online location based service program 105b executed on an online server system 107. The local component functionality may function as a subset of the online component functionality in the event that connectivity is not available.

As used herein, "application" refers to a user client device software designed to help a user to perform specific tasks. Applications may be bundled with the user client device and its system software. Alternately, applications may be published separately. In particular, "applications" may include location based applications. Location based applications may provide a location based service for the user. Examples of location based services include but are not limited to navigation services, information services, tracking services, and/or social services.

Referring back to the computerized system 100, the user may interact with the computerized system 100 via the user client device 102. The user client device may be a personal computer, computer-enabled wireless telephone, portable date assistant (PDA), or other computing device on which a computer operating system is configured to interact with an application. The user client device may include various components not shown in FIG. 1, including but not limited to a processor connected via a bus to volatile memory (e.g., Random Access Memory), non-volatile storage device (e.g., Read Only Memory), and/or mass storage device (e.g., a hard drive). The user client device further may be configured to receive input from one or more of associated user input device 106, such as a keyboard, mouse, stylus, camera, game controller, and/or microphone, and to send output to output devices such as a display 108 and audio speaker 110. It will be appreciated that these inputs and output devices may be integrated into the user client device, such as in a laptop or mobile telephone. A peripheral device 112 equipped with non-volatile storage may also be provided. The peripheral device 112 may be, for example, a memory-equipped stylus, mouse, portable USB flash drive, etc., and may be configured to connect directly, or via a wired or wireless connection to the user client device 102.

Data associated with the location based applications 104 and the location based service program may be stored in the user client device 102, in the peripheral device 112 associated with the user client device 102, or on a data store, such as a location content provider 116. The user client device 102 and the online server system 107 are configured to communicate via a computer network 118, which may include a wide area network (WAN). In other embodiments, for example, the computer network 118 may include a wireless telephone network configured to communicate with the user client device 102 and/or additional user client devices 114.

The computerized system may further include location finding equipment 122 so as to determine a location of the user client device 102 for use by the location based service program 105. It may be appreciated that the location finding equipment 122 may be included in the user client device 102 as shown at 122a, may be external to the user client device as shown at 122b, or may be present both within the user client device and external to the user client device. It may be further appreciated that the location finding equipment 122 may use any number of technologies. As examples, the location finding equipment 122 may determine the location of the user client device 102 using global positioning (GPS) technology or other satellite navigation, WiFi technology, cell tower triangulation, single cell tower technology, IP address, sound based technology, light based technology, any other positioning technology, or any combinations thereof. Note that these positioning technologies are well understood by those skilled in the art, and will not be described in detail herein. The invention described herein is not intended to be limited to the use of the exemplary positioning technologies referenced herein and it may be appreciated that any desired type of positioning or location identification technology may be used.

In this way, the location finding equipment 122 may send data relating to the location of the user client device 102 to the location based service program 105. Upon receiving the data relating to the location of the user client device 102, the location based service program 105 may determine a location of the user client device 102 and select one or more location based applications 104 based on the location of the user client device 102. Information for the one or more location based applications 104 may be stored in a data store on the online server system 107 or from a third party data store, such as location content provider 116, and then sent to the user client device 102, for example, via the computerized network 118. In this way, the one or more location based applications 104 may be launched on the user client device 102 based on the location of the user client device 102.

Figure 2:
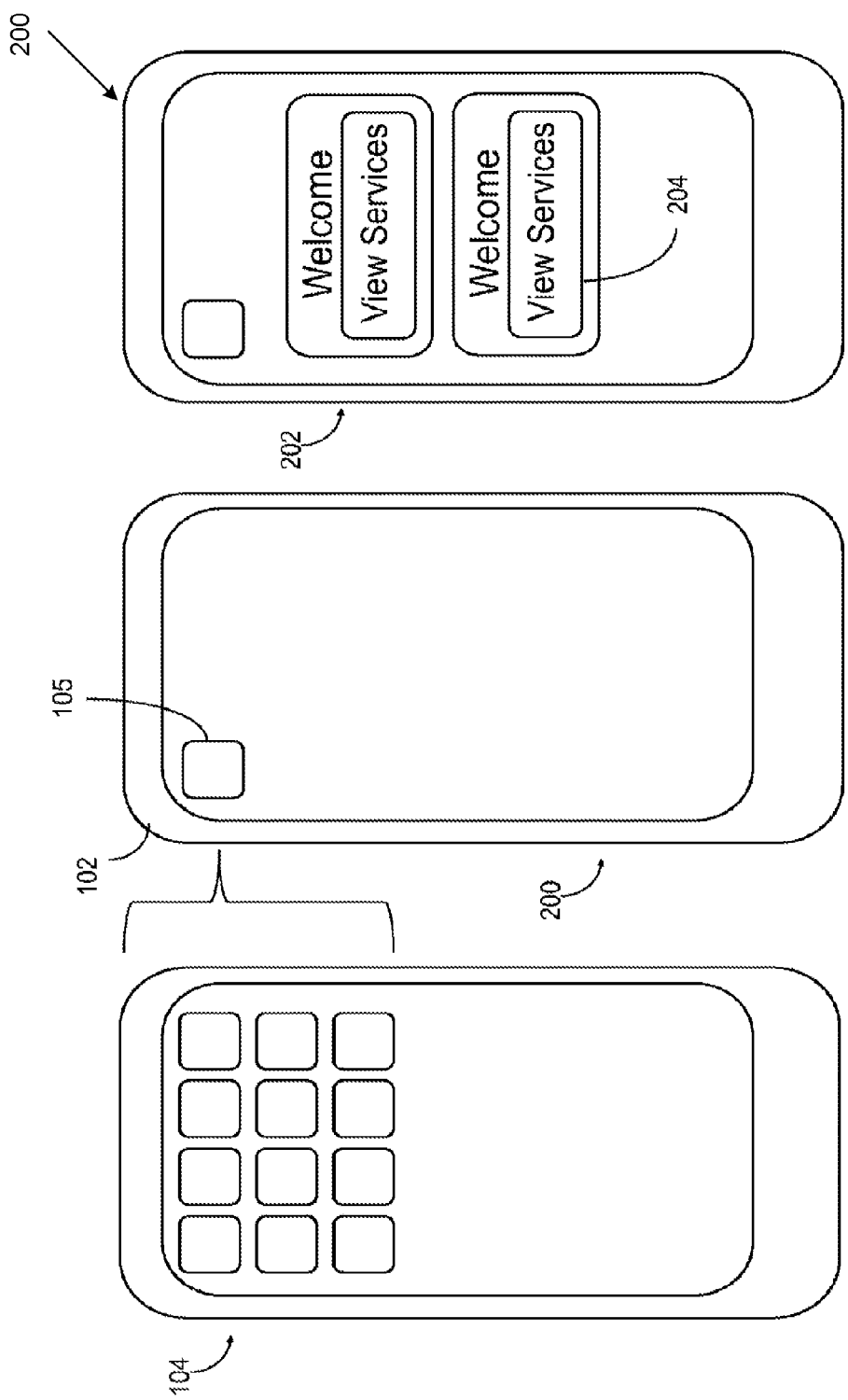
FIG. 2 is an exemplary embodiment of a graphical user interface, according to some embodiments.

FIG. 2 illustrates a schematic of the invention, according to some embodiments. In particular, FIG. 2 illustrates a graphic user interface 200 displayed via the user client device 102. As schematically shown at 202, the location based service program 105 of the present invention combines a plurality of location based applications 104 into a single location based service program. In doing this, the user may be alerted of location based applications 105 of the learning service program 105 available at the user location. In some embodiments, the graphical user interface 200 may include an alert 202 such that the user may be made aware of the location based applications available. Furthermore, the graphical user interface 200 may include a user input region 204 such that the user may allow one or more of the location based applications 115 to be launched on the user client device 102.

When the user arrives at a location which has an application, the infrastructure may also be able to detect the device has arrived. As such, 204 may also represent a notification that there are services and applications available at this location. If the user opts to engage with the notification that gets pushed to their device, the application will automatically launch the appropriate experience.

It may be appreciated that the user client device 102 shown in FIG. 2 is one embodiment of a user client device according to the present invention and that the user client device may comprise additional auxiliary features, such as a display, user input device, etc. as described above in reference to FIG. 1.

Referring now to FIG. 3, a flowchart 300 schematically illustrates a method, according to some embodiments of the invention. In a first step 302, the flowchart 300 includes reporting a location. In particular, at step 302, the location of at least one user client device may be reported to a location based service program. As described in detail above, determining the location of the user client device 102 may be accomplished using any positioning technology. It may be further appreciated that the reported location of the user client device 102 may be received from external location finding equipment, location finding equipment internal to the user client device, or any combination thereof.

At step 304, the method further includes querying a database of location based applications. In particular, the database is queried to identify location based applications associated with the location of the user client device 102. In some embodiments, locations associated with the location of the user client device 102 may include the actual location of the user client device 102; however, in other embodiments, locations associated with the location of the user client device 102 may include locations having a similar theme to the location of the user client device 102. In one illustrative example, the user client device 102 may be positioned within a museum. As such, an application for the museum may be identified. Further, an application for a bookstore having books on art housed in the museum may also be identified.

In some embodiments, method 300 may further include aggregating data for a plurality of locations. Further, each of the locations may be further associated with a location based application. As such, each location may be visited such that a location based experience may be created for each of the locations. Such location based experiences may be launched via the location based applications 104. As illustrative examples, location based experiences may include navigation services for a location, inventory services for items at a location, social application for interacting with other user client devices 114 also using the location based service program 105, although the invention described herein may be applicable for any location based service application.

At step 306, the method includes launching a location based application for the reported location. In particular, the location based application may be on the user client device so as to offer a user experience for the location of the user client device. In some embodiments, the method 300 may further include receiving a user input. As such, one of more the location based applications may be launched based on the user input. In one particular example, the user may give input, for example, via user input device so as to indicate that the location based service program 105 may launch one or more of the applications.

In some embodiments, the location based service program 105 may receive further user input from the user during the location based experience. In particular, the location based service program 105 may learn preferences of the user based on how the user interacts with one or more of the location based applications. Based on these learned preferences, the location based service program 105 may offer a specific location based experience.

In one illustrative example, a user may enter a museum. Location finding equipment reports a location of the user client device 102 to the location based service program 105. The location based service program 105 queries a database of location based applications 114 associated with the program and identifies a museum application that navigates the user through a museum and provides information on works of art displayed in the museum. Preferences of the user may be learned by the location based service program based on works of art, exhibits, etc. visited by the user, based on a length of time spent before any work of art, based on user input received while the application may be within a certain distance from any work of art. Alternately or in addition, a gender of the user may be identified depending on a location of restroom facilities visited by the user. Such preferences may be stored by the location based service program. Next, the user may visit a different location, such as a bookstore. The location based service program 105 may then use the information learned at the museum when launching the location based application for the bookstore. As such, in one example, recommendations for books at the bookstore associated with works of art may be offered through the application for the bookstore based on preferences learned during interaction with the location based service program at the museum. In this way a specific location based experience may be offered to a user based on preferences learned while the user interacts with the location based service program.

Another illustrative example may include locations advertising their services to users of other applications. For example, if we detect that a user launches several stadium applications, a sporting goods store may take that information and promote their application based on these past application launches. This is more than just advertising specific items at the store based on usage, as listed above, but rather advertising the entire application based on past launches. Of course, once the user launches the application, they could then get specific promotions based on their past activity.

It may be appreciated that the example described above includes one of many applications for the invention, as described herein. While the invention has been described with reference to various embodiments thereof, it will be appreciated by those of ordinary skill in the art that modifications can be made to the structure and elements of the invention without departing from the spirit and scope of the invention as a whole.

The invention includes a computerized method for providing a location based service, the method comprising reporting a location of at least one user client device to a location based service program, querying a database of location based applications of the location based service program to identify one or more location based applications associated with the location of the at least one user client device, and launching at least one of the one or more location based applications on the user client device so as to offer a user experience for the location of the user client device.

SUMMARY

The inventors have conceived of a computerized system and method that combines a plurality of location based applications into a single location based service program. Specifically, the system of the present invention may be downloaded in a single installation to provide location based services for a plurality of locations associated with the location based service program. The invention may be more fully understood by reference to the following drawings.

What is claimed is:

1. A computer implemented method, comprising:
   executing, at a mobile device including one or more processors, a location-based service program that provides an interface for a first location-specific experience comprising one or more application services related to a first location of the mobile device;
   learning user preference information comprising information obtained during interaction of a user with the first location;
   generating a display of the location-based service program interface;
   determining a second location of the mobile device that corresponds to the learned user preference information and is different from the first location;
   responsive to the determination, querying a database of a plurality of location-based application services using the second location of the mobile device and learned user preference information from the interaction of the user with the first location;
   identifying a second location-specific experience comprising one or more of the plurality of location-based applications associated with the second location of the mobile device; and
   modifying the location-based service program interface to display the identified location-specific experience.

2. The method of claim 1, wherein one of the first and second location-specific experience includes at least one of navigation services for a location and inventory services for items at a location.

3. The method of claim 1, wherein one of the first and second location-specific experience includes a social application for interacting with other user client devices.

4. The method of claim 1, wherein modifying the location-based service program interface includes downloading one of the first and second location-specific experience.

5. The method of claim 1, further comprising:
   generating an alert on the mobile device, wherein the alert identifies services associated with the second location.

6. The method of claim 5, further comprising:
   receiving a signal identifying a presence of the mobile device at the second location.

7. The computer-implemented method of claim 1, further comprising advertising other location based services on the location-based service program interface.

8. The method of claim 1, further comprising learning user preference information comprising information obtained during interaction of a user with the first location-specific experience.

9. A system comprising:
   one or more processors; and
   a non-transitory computer readable storage medium communicatively coupled to the one or more processors, wherein the non-transitory computer readable storage medium includes instructions that, when executed by the one or more processors, cause the one or more processors to perform operations including:
   executing, at a mobile device, a location-based service program that provides an interface for a first location-specific experience comprising one or more application services related to a first location of the mobile device;
   learning user preference information comprising information obtained during interaction of a user with the first location;
   generating a display of the location-based service program interface;
   determining a second location of the mobile device that corresponds to the learned user preference information;
   responsive to the determination, querying a database of a plurality of location-based application services using the second location of the mobile device and learned user preference information from the interaction of the user with the first location;
   identifying a second location-specific experience comprising one or more of the plurality of location-based applications associated with the second location of the mobile device; and
   modifying the location-based service program interface to display the identified location-specific experience.

10. The system of claim 9, wherein one of the first and second location-specific experience includes at least one of navigation services for a location and inventory services for items at a location.

11. The system of claim 9, wherein the operations further include:
generating an alert on the mobile device, wherein the alert identifies services associated with the location.

12. The system of claim 9, wherein the operations further include:
generating an alert on the mobile device, wherein generating the alert includes receiving a signal identifying a presence of the mobile device at the second location.

13. The system of claim 9, wherein the operations further include: advertising other location based services on the location-based service program interface.

14. The system of claim 9, wherein the operations further include: learning user preference information comprising information obtained during interaction of a user with the first-location specific experience.

15. A non-transitory computer readable medium comprising instructions that, when executed by one or more processors, cause the one or more processors to perform operations including:
executing, at a mobile device, a location-based service program that provides an interface for a first location-specific experience comprising one or more application services related to a first location of the mobile device;
learning user preference information comprising information obtained during interaction of a user with the first location;
generating a display of the location-based service program interface;
determining a second location of the mobile device that corresponds to the learned user preference information;
responsive to the determination, querying a database of a plurality of location-based application services using the second location of the mobile device and learned user preference information from the interaction of the user with the first location;
identifying a second location-specific experience comprising one or more of the plurality of location-based applications associated with the second location of the mobile device; and
modifying the location-based service program interface to display the identified location-specific experience.

16. The non-transitory computer readable medium of claim 15, wherein one of the first and second location-specific experience includes at least one of navigation services for a location, inventory services for items at a location, and a social application for interacting with other user client devices.

17. The non-transitory computer readable medium of claim 15, wherein modifying the location-based service program interface includes downloading one of the first and second location-specific experience.

18. The non-transitory computer readable medium of claim 15, further comprising instructions that, when executed by the one or more processors, cause the one or more processors to perform operations including:
generating an alert on the mobile device, wherein the alert identifies services associated with the second location.

19. The non-transitory computer readable medium of claim 15, further comprising instructions that, when executed by the one or more processors, cause the one or more processors to perform operations including:
generating an alert on the mobile device, wherein generating includes receiving a signal identifying a presence of the mobile device at the second location.

20. The non-transitory computer readable medium of claim 15, further comprising instructions that, when executed by the one or more processors, cause the one or more processors to perform operations including:
advertising other location based services on the location-based service program interface.

* * * * *